(12) United States Patent
Fan et al.

(10) Patent No.: US 7,303,170 B2
(45) Date of Patent: Dec. 4, 2007

(54) MOUNTING APPARATUS

(75) Inventors: Chen-Lu Fan, Shenzhen (CN); Chieh Yang, Shenzhen (CN); Li-Ping Chen, Shenzhen (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 26 days.

(21) Appl. No.: 11/308,956

(22) Filed: May 29, 2006

(65) Prior Publication Data
US 2007/0205349 A1  Sep. 6, 2007

(30) Foreign Application Priority Data
Mar. 2, 2006  (CN)  .................. 2006 2 0055847 U

(51) Int. Cl.
G12B 9/00  (2006.01)
(52) U.S. Cl. .................. 248/27.3; 312/332.1; 248/694; 361/985
(58) Field of Classification Search .............. 248/27.1, 248/27.3, 694, 201, 314; 361/685, 727; 312/332.1, 312/223.2
See application file for complete search history.

(56) References Cited

U.S. PATENT DOCUMENTS

| | | | | |
|---|---|---|---|---|
| 4,065,087 A * | 12/1977 | Solden | ........................ | 248/201 |
| 5,327,323 A * | 7/1994 | Yeom et al. | ................. | 361/685 |
| 5,442,513 A * | 8/1995 | Lo | ............... | 361/685 |
| 5,467,947 A * | 11/1995 | Quilling, II | ................. | 248/27.1 |
| 5,560,572 A * | 10/1996 | Osborn et al. | ............. | 248/27.3 |
| 5,767,445 A * | 6/1998 | Wu | ............. | 174/542 |
| 6,011,701 A * | 1/2000 | Kopp et al. | .................. | 361/818 |
| 6,231,145 B1 | 5/2001 | Liu | | |
| 6,305,660 B1 * | 10/2001 | Liao | ........................... | 248/694 |
| 6,418,011 B2 * | 7/2002 | Omori | ......................... | 361/683 |
| 2002/0181198 A1 | 12/2002 | White et al. | ................ | 361/685 |
| 2006/0034048 A1 * | 2/2006 | Xu | ............................. | 361/685 |
| 2006/0056150 A1 * | 3/2006 | Behl et al. | ................... | 361/687 |
| 2006/0087808 A1 * | 4/2006 | Yang | ........................... | 361/685 |

* cited by examiner

Primary Examiner—Ramon O Ramirez
(74) Attorney, Agent, or Firm—Wei Te Chung

(57) ABSTRACT

A mounting apparatus includes a bracket (10), a cage (20), a front panel (30), and two sliding members (40). The bracket defines two locking openings (122) therein. The cage is slidably attachable to the bracket. The front panel is slidably attachable to the cage, and has a first sliding direction along which the cage slides into the bracket. Two operating poles (36) are formed on the front panel. Two sliding members are slidably disposed in the cage, and have a second sliding direction perpendicular to the first sliding direction. The sliding members are driven by the operating poles of the front panel for engaging into the locking openings of the bracket.

17 Claims, 5 Drawing Sheets

MOUNTING APPARATUS

FIELD OF THE INVENTION

The present invention relates to mounting apparatuses, and more particularly to a mounting apparatus for an enclosure.

DESCRIPTION OF RELATED ART

In a conventional server or computer system, a plurality of devices, such as data storage devices, are mounted within an enclosure. In order to improve convenience of service and replacement of the devices, screwless mounting apparatuses are often provided.

For example, a mobile rack assembly includes a mounting bracket, a mobile rack, and a handle frame. The mounting bracket defines two locking holes in a top side thereof. The mobile rack is used to accommodate a data storage device, and can be slid into the mounting bracket. The handle frame is mounted on the mobile rack. A handgrip is pivotably attached to opposite sides of the handle frame. Two locking parts are formed on free ends of the handgrip, corresponding to the locking holes of the mounting bracket. In assembly, the mobile rack is slid into the mounting bracket. The handgrip is rotated down. The locking parts of the handgrip engage into the locking holes of the mounting bracket, and urge the mobile rack to further slide into the mounting bracket. In disassembly, the handgrip is rotated up. The locking parts press against edges of the locking holes. The mobile rack is thereby pulled outward. When the locking parts are disengaged from the locking holes, the mobile rack is thus slid out from the mounting rack. However, this mounting means is still inconvenient.

What is needed, therefore, is a mounting apparatus for providing convenience in assembly and removal of a device within an enclosure.

SUMMARY OF INVENTION

A mounting apparatus includes a bracket, a cage, a front panel, and two sliding members. The bracket defines two locking openings therein. The cage is slidably attachable to the bracket. The front panel is slidably attachable to the cage, and has a first sliding direction along which the cage slides into the bracket. Two operating poles are formed on the front panel. Two sliding members are slidably disposed in the cage, and have a second sliding direction perpendicular to the first sliding direction. The sliding members match with the operating poles of the front panel for engaging into the locking openings of the bracket.

Other advantages and novel features will be drawn from the following detailed description of preferred embodiments with attached drawings, in which:

DETAILED DESCRIPTION

Figure 1:
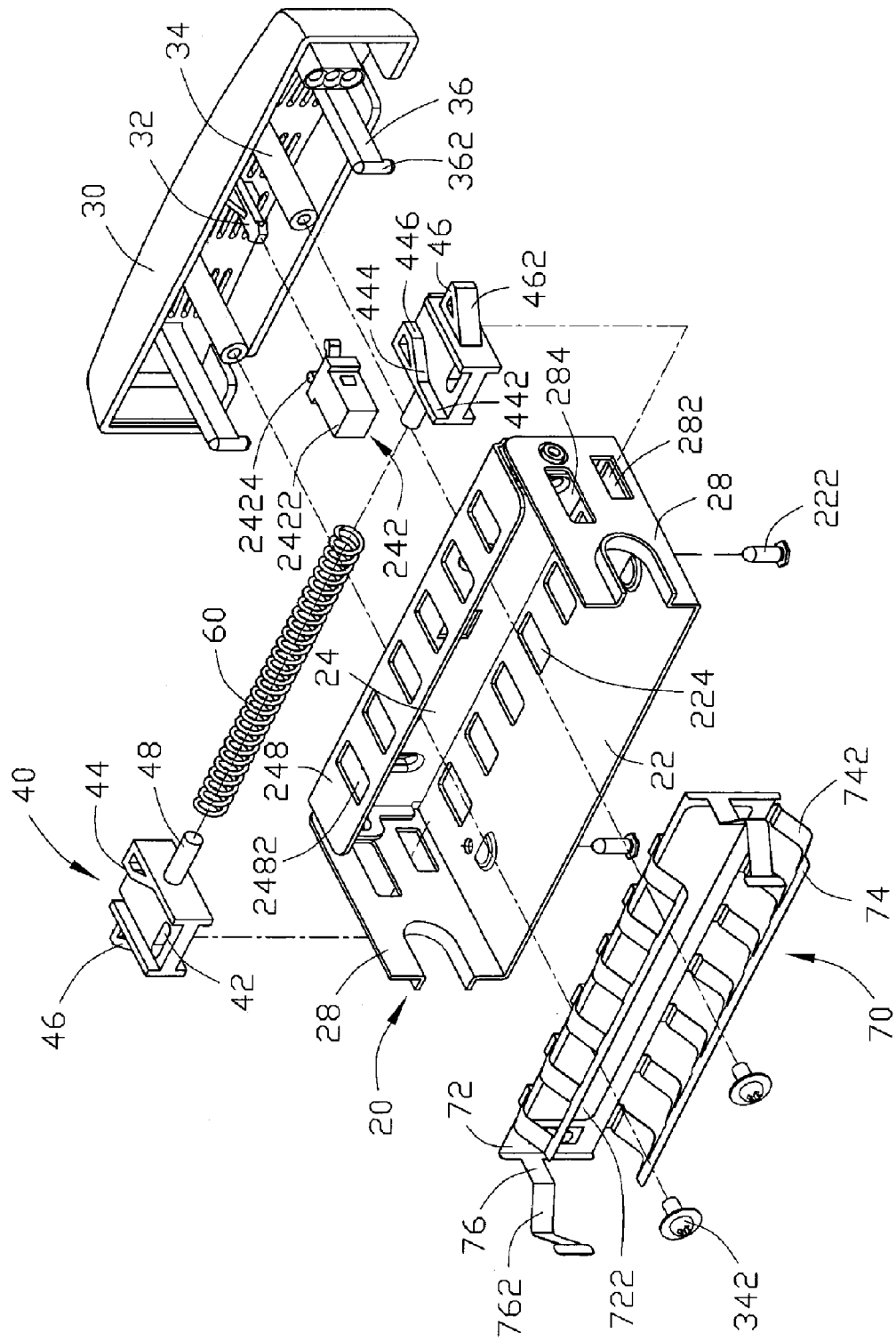
FIG. 1 is an exploded, isometric view of a mounting apparatus of a preferred embodiment of the present invention, the mounting apparatus including a cage, a front panel, and a pair of sliding members.
Figure 5:
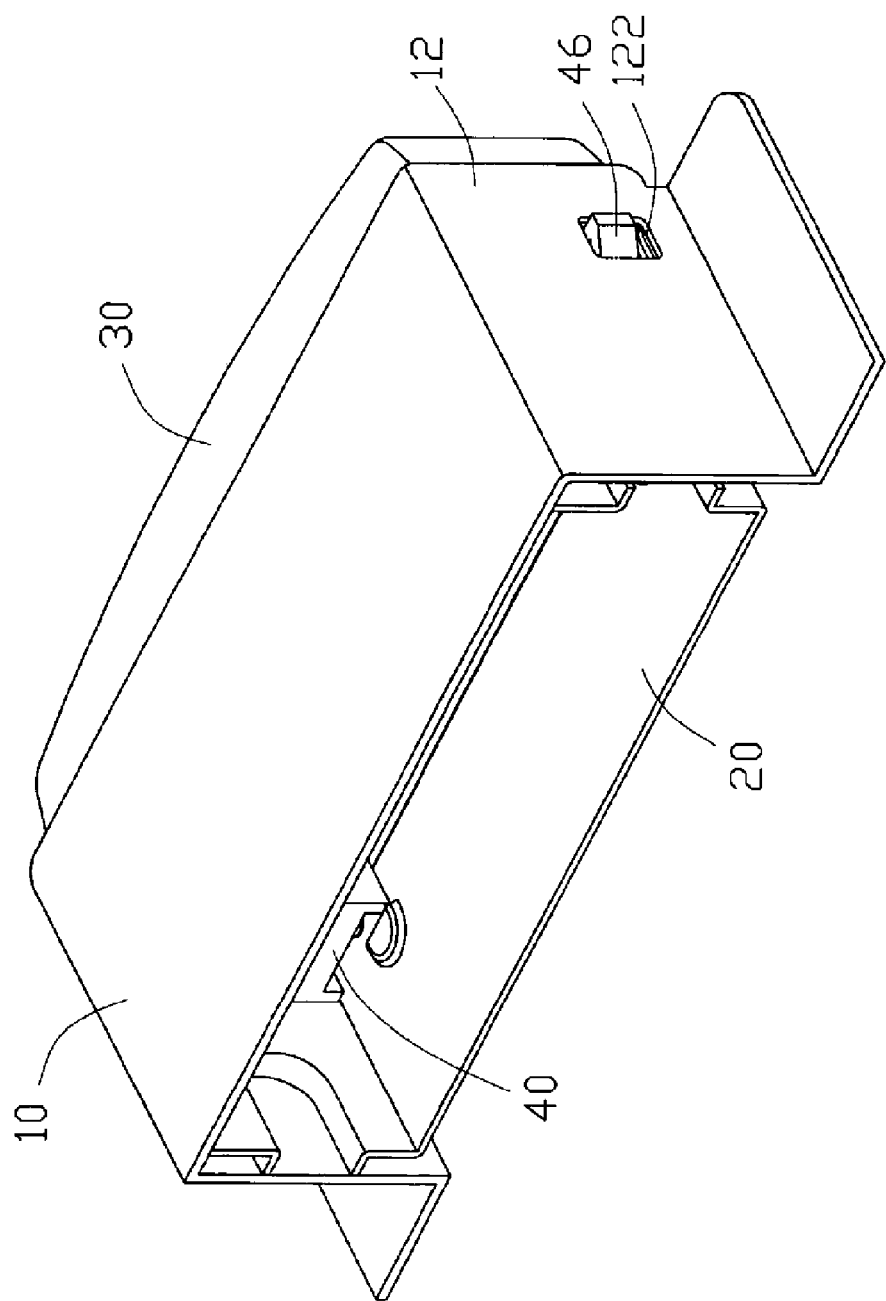
FIG. 5 is similar to FIG. 3, and including a bracket.

Referring to FIGS. 1 and 5, a mounting apparatus of a preferred embodiment of the present invention includes a bracket 10 disposed in a server or computer enclosure, a cage 20 used for accommodating a device, such as a data storage device which is used in this embodiment as an example, a front panel 30, and a pair of sliding members 40.

The bracket 10 includes two parallel side plates 12. A locking opening 122 is defined in each side plate 12.

Figure 2:
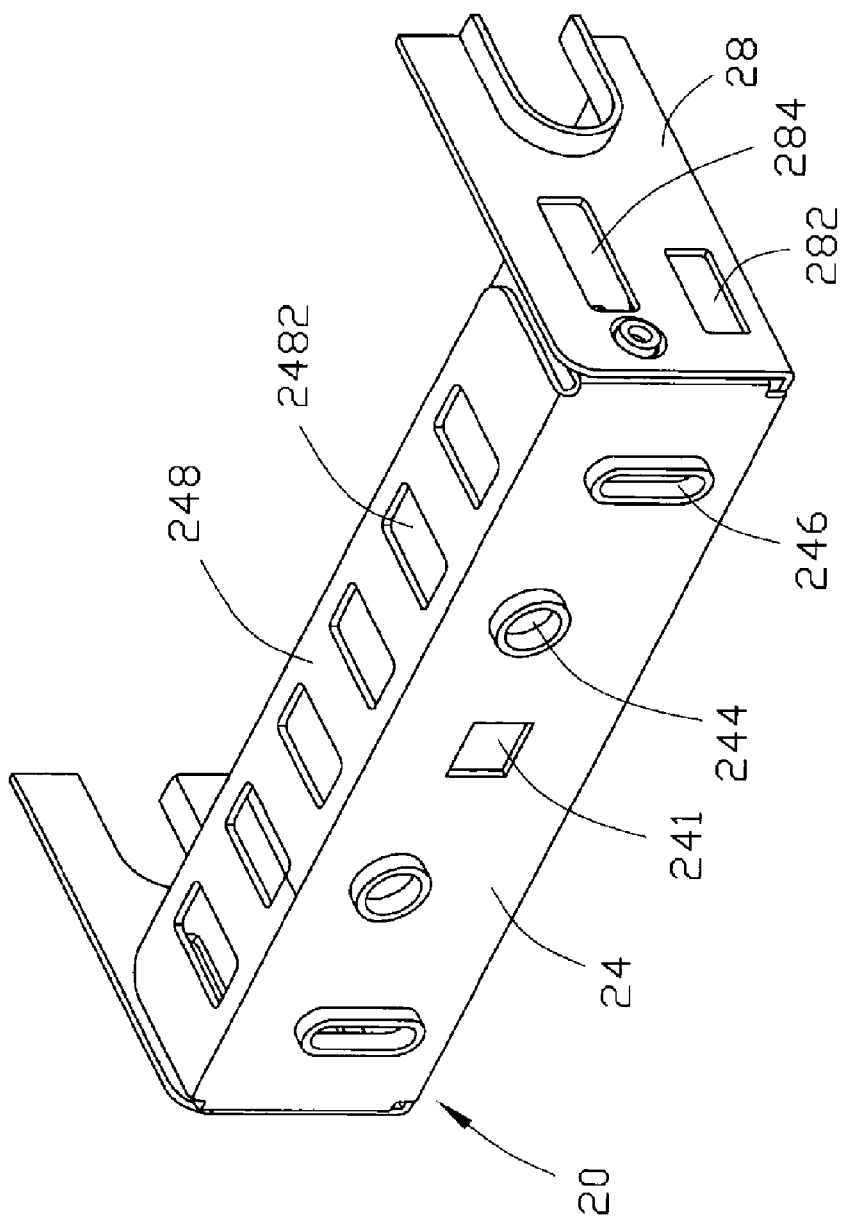
FIG. 2 is another isometric view of the cage of FIG. 1.

Referring to FIGS. 1 and 2, the cage 20 includes a bottom wall 22, a front wall 24, and two parallel side walls 28. The front wall 24 and the side walls 28 are perpendicularly bent up from adjacent edges of the bottom wall 22 respectively, and together with the bottom wall 22 form a space to accommodate the data storage device. Two positioning posts 222 are installed on the bottom wall 22, one adjacent each side wall 28. A plurality of through openings 224 is defined in the bottom wall 22 adjacent the front wall 24. A rectangular opening 241 is defined in the front wall 24. A circular hole 244 and a generally ellipse-shaped hole 246 are defined at each side of the rectangular opening 241. A latch 242 is installed into the rectangular opening 241 of the front wall 24. The latch 242 includes a base body 2422 and a claw portion 2424, and has the following function: the claw portion 2424, when first compressed into the base body 2422, grasps at the same time. When the claw portion 2422 is compressed again and then released, the claw portion 2424 slides out of the base body 2422 and splays. A bent flange 248 is formed at a top edge of the front wall 24, and defines a plurality of through openings 2482. Two through openings 282, 284 are defined in each side wall 28, and arranged along a direction generally perpendicular to the bottom wall 22.

The front panel 30 is slidably attachable to the front wall 24 of the cage 20. A hook 32, two stopping posts 34, and two operating poles 36 are formed on an inner surface of the front panel 30, respectively corresponding to the rectangular opening 241, the circular holes 244, and the ellipse-shaped holes 246 of the front wall 24 of the cage 20. A driving portion 362 is formed at a free end of each operating pole 36.

The sliding members 40 are slidably disposed on the bottom wall 22 of the cage 20. Each sliding member 40 defines a slot 42 extending along a direction perpendicular to the side walls 28 of the cage 20, for receiving the positioning posts 222. A step portion 44 is formed on each sliding member 40 for engaging with the driving portions 362 of the operating poles 36 of the front panel 30, and includes a first surface 442, a second surface 446, and a slanting transition surface 444. The first surface 442 and the second surface 446 are both parallel to the side walls 28 of the cage 20, and connected by the transition surface 444. A locking block 46 with a slanting surface 462 is formed at a side surface of each sliding member 40 corresponding to the through openings 282 of the side walls 28, and a securing post 48 is formed at the other side thereof.

A shielding member 70 is further provided in the mounting apparatus of the preferred embodiment to reduce EMI (electronic magnetic interference), and includes a base clip 72, a pair of bent clips 74, and a pair of finger clips 76. A rectangular opening 722 is defined in the base clip 72. The bent clips 74 are formed at top and bottom edges of the base clip 72 respectively. A plurality of spaced protruding portions 742 is formed on the bent clips 74, corresponding to the through openings 224, 2482 of the cage 20. The finger clips 76 are formed on opposite side edges of the base clip 72. A protruding portion 762 is formed on each finger clip 76, corresponding to the through openings 284 of the cage 20.

Figure 3:
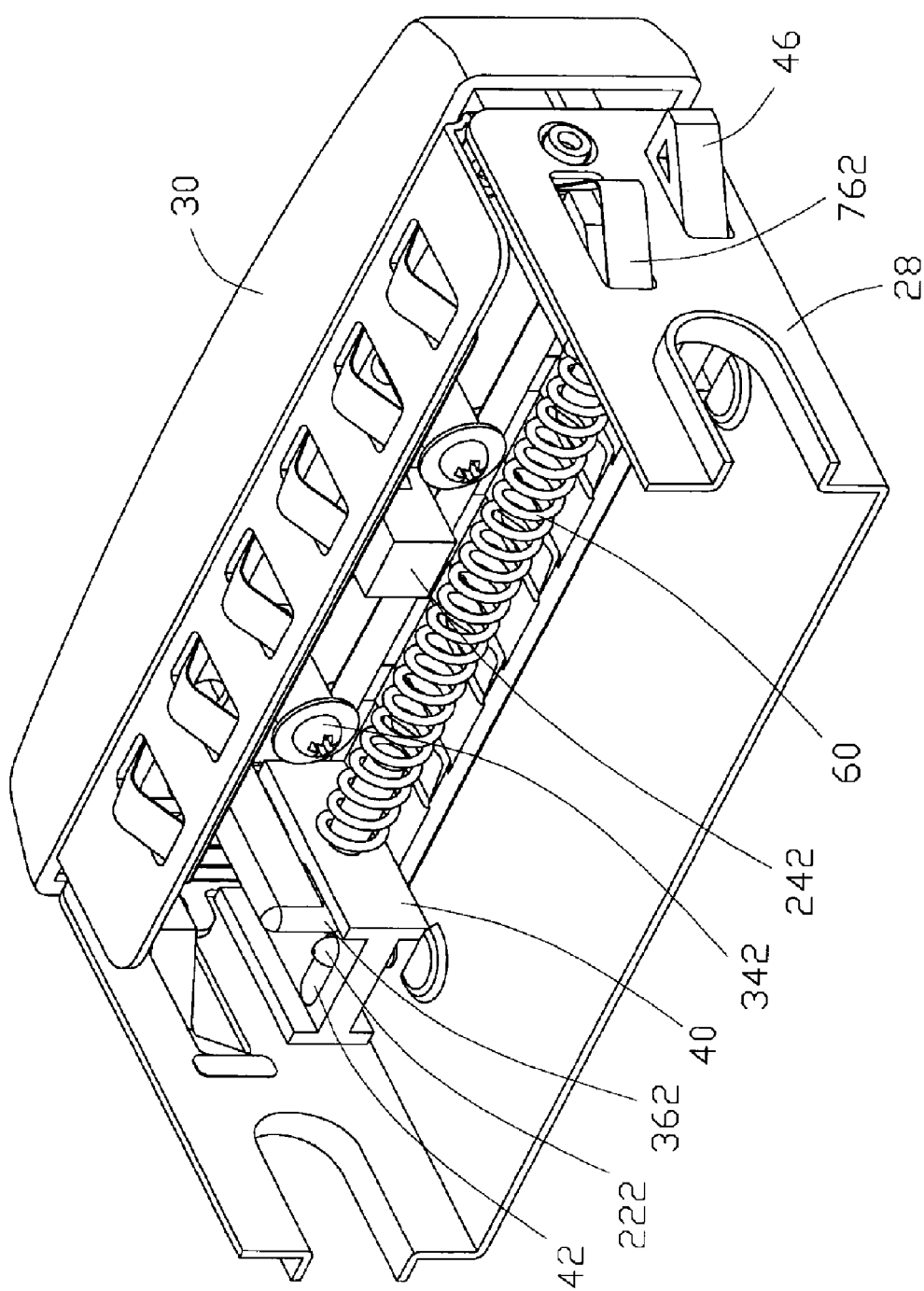
FIG. 3 is an assembled view of FIG. 1, and showing the front panel in a locked position.
Figure 4:
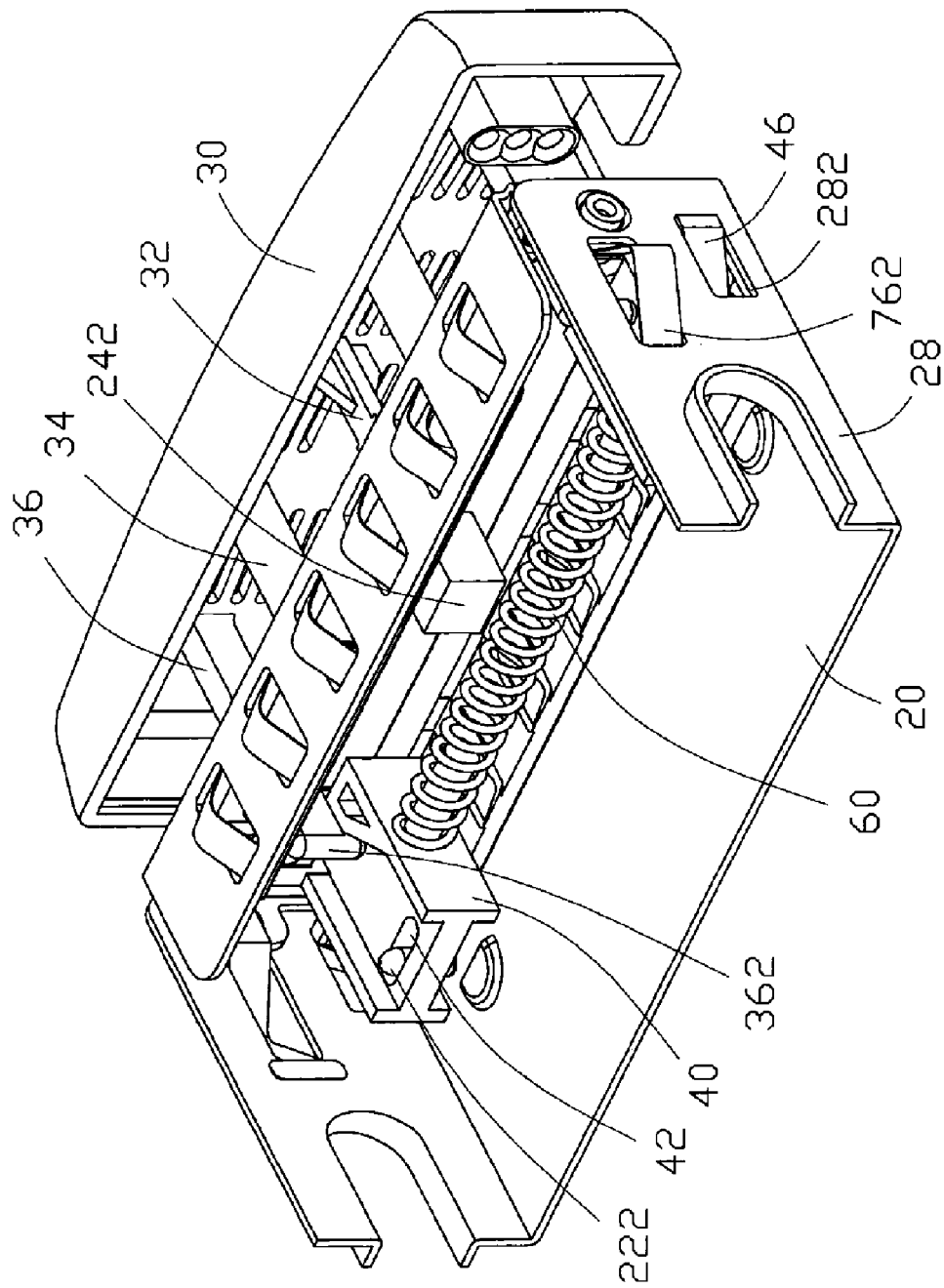
FIG. 4 is similar to FIG. 3, but showing the front panel in an unlocked position.

Referring also to FIGS. 3 to 5, in assembly, the shielding member 70 is installed in the cage 20. The base clip 72 abuts on the front wall 24. The bent clips 74 abut on the bottom wall 22 and the bent flange 248, and the protruding portions 742 are engaged into the through openings 224, 2482. The finger clips 76 abut on the side walls 28, and the protruding portions 762 are engaged into the through openings 284. The sliding members 40 are disposed on the bottom wall 22 of the cage 20. The positioning posts 222 are inserted into the slots 42 of the sliding members 40. The sliding members 40 are then pushed to insert the locking blocks 46 into the through openings 282 of the side walls 28. A spring 60 is arranged on the securing posts 48 between the sliding members 40, and has a first resilient deformation. The sliding members 40 thereby tightly abut on the side walls 28 of the cage 20. The stopping posts 34 and the operating poles 36 of the front panel 30 are respectively inserted into the circular holes 244 and the ellipse-shaped holes 246 of the front wall 24 of the cage 20. The driving portions 362 of the operating poles 36 engage with the step portions 44 of the sliding members 40. Two fasteners 342, such as screws, are engaged with free ends of the stopping posts 34. The fasteners 342 have greater diameters than that of the circular holes 244 of the front wall 24, thereby preventing the stopping posts 34 sliding out from the circular holes 244. The front panel 30 is thus slidably secured to the front wall 24 of the cage 20.

Before the cage 20 is installed into the bracket 10, the front panel 30 lies in an unlocked position, as shown in FIG. 4. The hook 32 is detached from the claw portion 2424 of the latch 242. The driving portions 362 of the operating poles 36 abut against the second surfaces 446. The spring 60 has a second resilient deformation, and a shorter length than that in the first resilient deformation. In assembling the cage 20 into the bracket 10, the front panel 30 is pushed and slid into the cage 20. The driving portions 362 slide from the second surfaces 446 to the first surfaces 442 of the sliding members 40. The spring 60 elongates gradually. When the hook 32 compresses the claw portion 2424 of the latch member 242 into the base body 2422, the claw portion 2424 grasps the hook 32. The front panel 30 is thus located on the front wall 24 of the cage 20, and lies in a locked position, as shown in FIG. 3. At the same time, the driving portions 362 engage on the first surfaces 442 of the sliding members 40. The spring 60 has the first resilient deformation again. The locking blocks 46 of the sliding members 40 are inserted through the through openings 282 of the side walls 28 of the cage 20.

The front panel 30 is further pushed in, and the cage 20 and the front panel 30 are together slid into the bracket 20. The side plates 12 of the bracket 10 press the slanting surfaces 462 of the locking blocks 46 of the sliding members 40, and the sliding members 40 are compressed inward. The spring 60 has the second resilient deformation. When the locking blocks 46 align with the locking openings 122 of the side plates 12 of the bracket 10, the spring 60 urges the locking blocks 46 to slide out of the cage 20 and engage into the locking openings 122. The spring 60 has the first resilient deformation. The cage 20 is thus secured into the bracket 10, as shown in FIG. 5.

In removing the cage 20 from the bracket 10, the front panel 30 is pressed and then released. The claw portion 2424 of the latch member 242 is compressed by the hook 32 of the front panel 30, and then released. The claw portion 2424 extends out from the base body 2422 to push the front panel 30. The front panel 30 is urged out a distance. The hook 32 is released from the claw portion 2424. The front panel 30 can be thus pulled out. When the driving portions 362 of the operating poles 36 are slid from the first surfaces 444 to the second surfaces 446 of the sliding members 40, the locking blocks 46 are urged into the cage 20 again. The cage 20 is disengaged from the bracket 10, and can be accordingly taken out therefrom.

In assembling the data storage device, the data storage device can be placed into the cage 20. Then, the mounting apparatus of the preferred embodiment is very convenient for installing the data storage device into the bracket 10.

In the mounting apparatus of the preferred embodiment body, the front panel 30 is slid on the front wall 24 of the cage 20 along a direction perpendicular to the front wall 24, so additional space at both sides of the bracket 10 is not needed. Therefore, the usage of restricted space of the server or computer enclosure is improved.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting apparatus comprising:
a bracket with two locking openings defined therein;
a cage slidably attachable to the bracket;
a front panel slidably attachable to the cage, having a first sliding direction along which the cage slides into the bracket, two operating poles formed on the front panel; and
two sliding members slidably disposed in the cage, each having a second sliding direction perpendicular to the first sliding direction, the sliding members being driven by the operating poles of the front panel for engaging into the locking openings of the bracket.

2. The mounting apparatus as described in claim 1, wherein a step portion is formed on each of the sliding members, and a driving portion is formed on each of the operating poles for matching with the step portion.

3. The mounting apparatus as described in claim 2, wherein the step portion of the sliding member includes a first surface, a second surface, and a slanting transition surface connecting the first and second surfaces.

4. The mounting apparatus as described in claim 1, wherein a locking block with a slanting surface is formed on each of the sliding members for engaging into the locking openings of the bracket.

5. The mounting apparatus as described in claim 4, wherein the cage defines two through openings for the locking blocks of the sliding members extending therethrough to engage into the locking openings of the bracket.

6. The mounting apparatus as described in claim 1, further comprising a spring disposed between the sliding members.

7. The mounting apparatus as described in claim 1, wherein two positioning posts are installed on the cage, and each of the sliding members defines a slot extending in the second sliding direction for slidably receiving the positioning posts therein.

8. The mounting apparatus as described in claim 1, wherein the cage defines two holes for receiving the operating poles of the front panel, and a stopping post is formed on the front panel for preventing the front panel detaching from the cage.

9. The mounting apparatus as described in claim 1, wherein a latch is installed on the cage for locking the front panel to the cage, and capable of pushing the front panel to slide out from the cage after the front panel being pressed and released.

10. A mounting apparatus comprising:
- a bracket comprising two parallel side plates, each of the side plates defining a locking opening therein;
- a cage slidably attachable to the bracket, comprising a front wall extending perpendicular to the side plates of the bracket;
- a front panel attachable to the front wall of the cage, sliding along a first direction perpendicular to the front wall, two operating poles formed on the front panel; and
- two sliding members slidably disposed in the cage, a slanting transition surface formed on each of the sliding members and engaging with the operating poles of the front panel for urging the sliding members into the locking openings of the side plates of the bracket.

11. The mounting apparatus as described in claim 10, wherein a step portion is formed on each of the sliding members, and a driving portion is formed on each of the operating poles for coupling with the step portion.

12. The mounting apparatus as described in claim 11, wherein the step portion of each of the sliding members includes a first surface, a second surface, and the slanting transition surface connecting the first and second surfaces.

13. The mounting apparatus as described in claim 12, wherein a locking block with a slanting surface is formed on each of the sliding members for engaging into the locking openings of the bracket.

14. The mounting apparatus as described in claim 13, wherein the cage defines two through openings for the locking blocks of the sliding members inserting therethrough to engage into the locking openings of the bracket.

15. The mounting apparatus as described in claim 10, further comprising a spring disposed between the sliding members.

16. The mounting apparatus as described in claim 10, wherein two positioning posts are installed on the cage, and the sliding members each define a slot therein for slidably receiving the corresponding positioning post therein.

17. The mounting apparatus as described in claim 10, wherein a stopping post is formed on the front panel for preventing the front panel detaching from the cage.

* * * * *